Dec. 15, 1970  M. R. SOMMERIA  3,548,278

SERVO SYSTEM

Filed April 26, 1968  5 Sheets-Sheet 1

Inventor
Marcel R. Sommeria
By Pendleton, Neuman,
Seibold & Williams
Attorneys

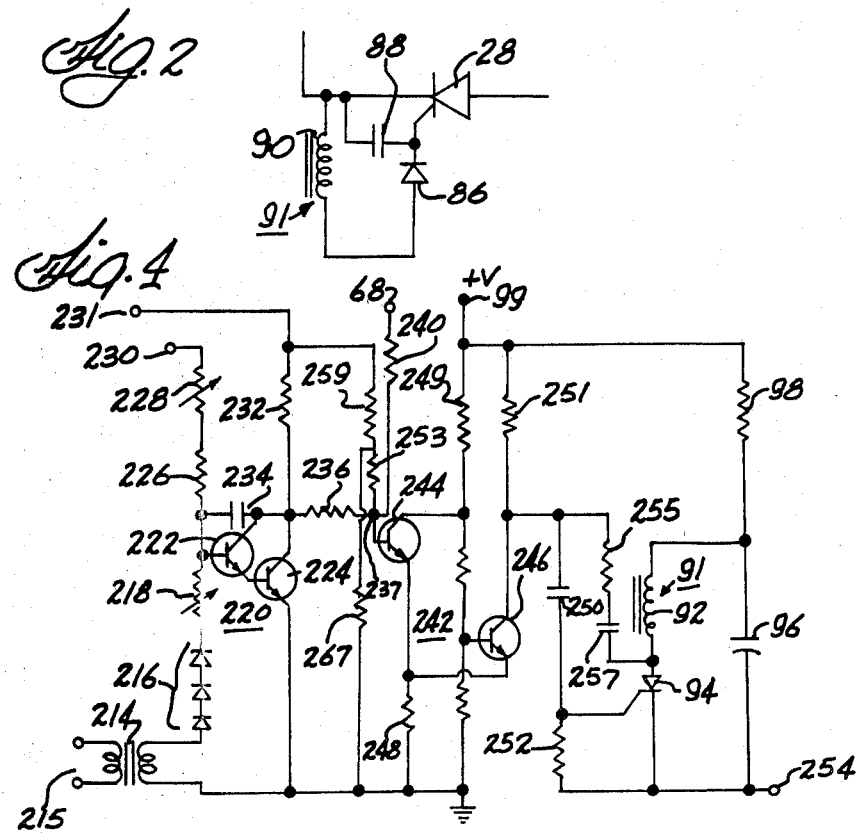

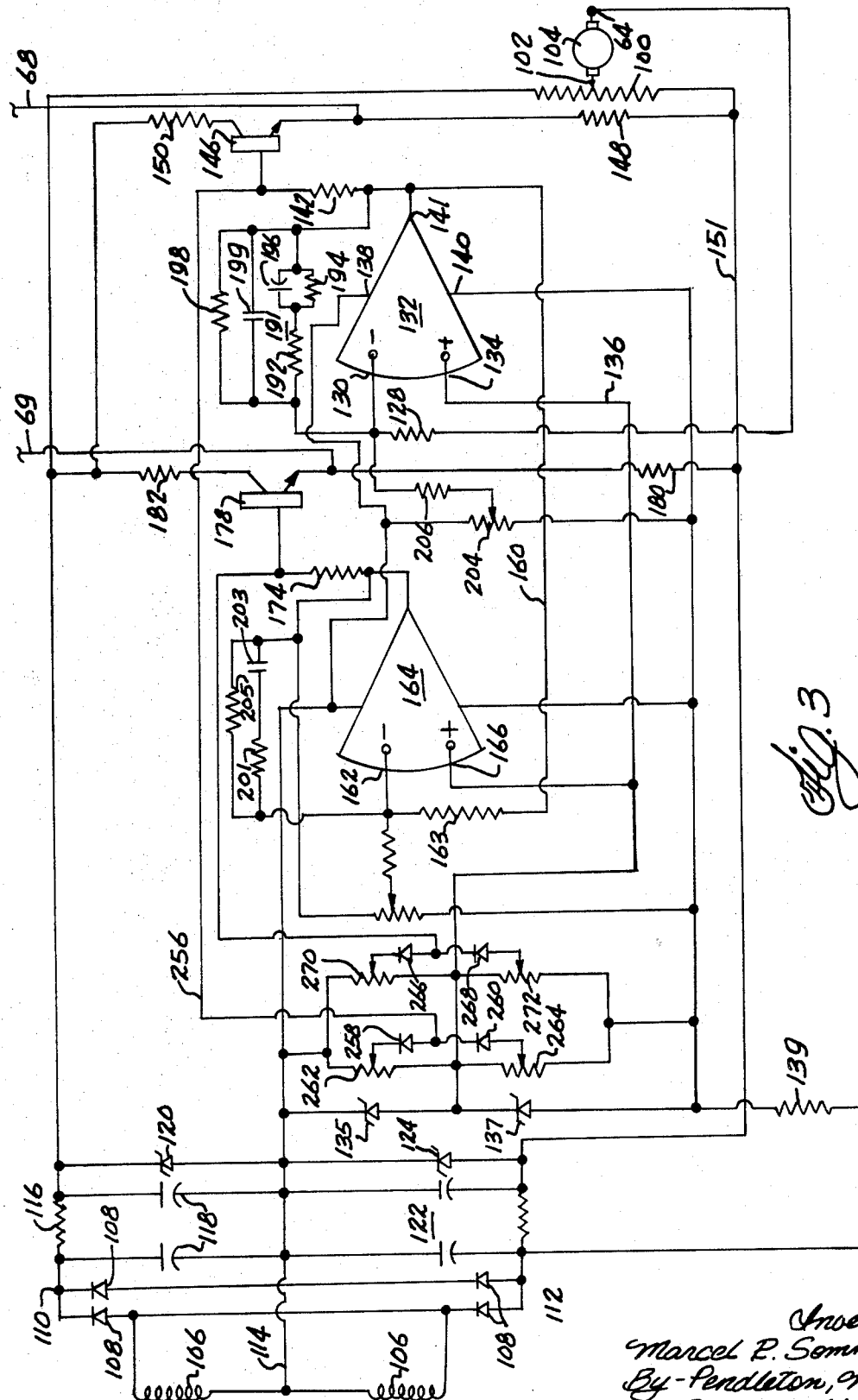

United States Patent Office 3,548,278
Patented Dec. 15, 1970

3,548,278
SERVO SYSTEM
Marcel R. Sommeria, Palos Heights, Ill., assignor to Hyper-Loop, Inc., Summit, Ill., a corporation of Illinois
Filed Apr. 26, 1968, Ser. No. 724,418
Int. Cl. H02p 5/00
U.S. Cl. 318—257
10 Claims

ABSTRACT OF THE DISCLOSURE

The present disclosure relates to servo systems in which an electric motor is controlled as to speed and direction by a number of SCR's interposed between the motor and a source of AC power. The SCR's are arranged in two groups and a pair of inductors are connected in series between the two groups; the motor is connected between a neutral point and the interconnection of the two inductors. The SCR's are gated in timed relation during each cycle, to bring about either acceleration or deceleration of the motor, in response to a control voltage. At no load, the two groups of SCR's have small, equal firing angles, and there is a small idling current through the inductors. In response to the control circuit, under load conditions, the firing angle of the SCR's in one of the groups is increased while the firing angle of the SCR's in the other group is decreased, the magnitude of increase being more than the magnitude of decrease.

---

This application relates to a servo control system and, more particularly, to a novel and improved control system incorporating a cycloconverter in which a DC motor is controlled for operation by a multi-phase AC voltage source.

In prior art control systems of the type disclosed in my Pat. Nos. 2,859,399 and 3,237,075, two converters are employed, each constituted by a group of rectifiers, and the EMF and counter EMF of the converters are maintained in equality for any firing points of the rectifiers in each group. As a consequence, relatively high idling currents in the inductors are realized, and relatively large-capacity inductors are required. As a consequence, the systems, as described in the above-identified patents, have relatively large reactive power consumption and relatively poor frequency response.

The presence of an inductor in the circuit is beneficial to guard against the possibility of failure of the rectifiers, and to guard against the possibility of the rectifiers being triggered into conduction inadvertently by line transients or the like. The presence of an inductor also permits the motor to be run in a highly reactive condition without danger of a short circuit occurring across the line because of simultaneous firings of two rectifiers.

It is therefore highly desirable to provide a means for achieving the advantages of an inductor in the circuit without the attendant disadvantages of poor efficiency and poor frequency response which are inherent in prior art systems.

In the present invention, an arrangement is provided in which a low value of inductance may be used. The reduced value of inductance improves the frequency response of the servo circuit. The present invention also reduces the reactive power consumption of the system. The smaller value of inductive reactance is feasible in the system of the present invention because the firing angles of the two converters are shifted in an asymmetrical manner, so that the firing angle of one converter may be increased by more than the firing angle of the other is decreased.

Accordingly, one object of the present invention is to provide a servo system capable of operation in an accelerating or decelerating mode throughout the entire range of motor operation, but having improved efficiency over comparable apparatus of the prior art.

Another object of the present invention is to provide such a system in which provision is made against accident short circuits, but in which the idling currents are reduced to a small value of those associated with apparatus of the prior art.

Another object of the present invention is to provide such a servo system in which the change of the firing angles of two converters associated with the motor may be varied in an asymmetrical manner.

These and other objects of the present invention will be more fully understood upon an examination of the following description and claims together with the accompanying drawings.

In one embodiment of the present invention, there is provided a servo system operable to control the operation of a DC motor powered by a source of AC voltage, the servo system comprising a pair of reverse-poled rectifiers for each phase of a multi-phase power supply, means interconnecting common electrodes of each of two groups of similarly poled rectifiers, inductance means interconnecting the common electrode of one of said groups to the common electrode of the other said group, motor means connected between said inductance means and a reference voltage, means for causing each of said rectifiers to fire once during each cycle of said AC voltage, said last named means including means to cause the firing angle of each of said rectifiers to be less than the quotient of 360 degrees divided by the number or rectifiers units associated with both of said groups, and control means for modifying the firing angles of both of said groups in inverse relationship, the firing angle of one of said groups being modified by said last named means by a larger amount than that of the other of said groups.

Reference will now be made to the accompanying drawings in which:

FIG. 2 is a schematic circuit diagram of the power section of the apparatus illustrated in FIG. 1;

FIG. 3 is a schematic circuit diagram of the threshold section of the apparatus illustrated in FIG. 1;

FIG. 4 is a schematic circuit diagram of one of the sawtooth generators, one of the comparator circuits, and one of the triggering circuits of the apparatus illustrated in FIG. 1;

FIG. 5 is a graph of the relative EMF and counter EMF associated with two groups of silicon controlled rectifiers employed in the apparatus of FIG. 1;

Figure 1:
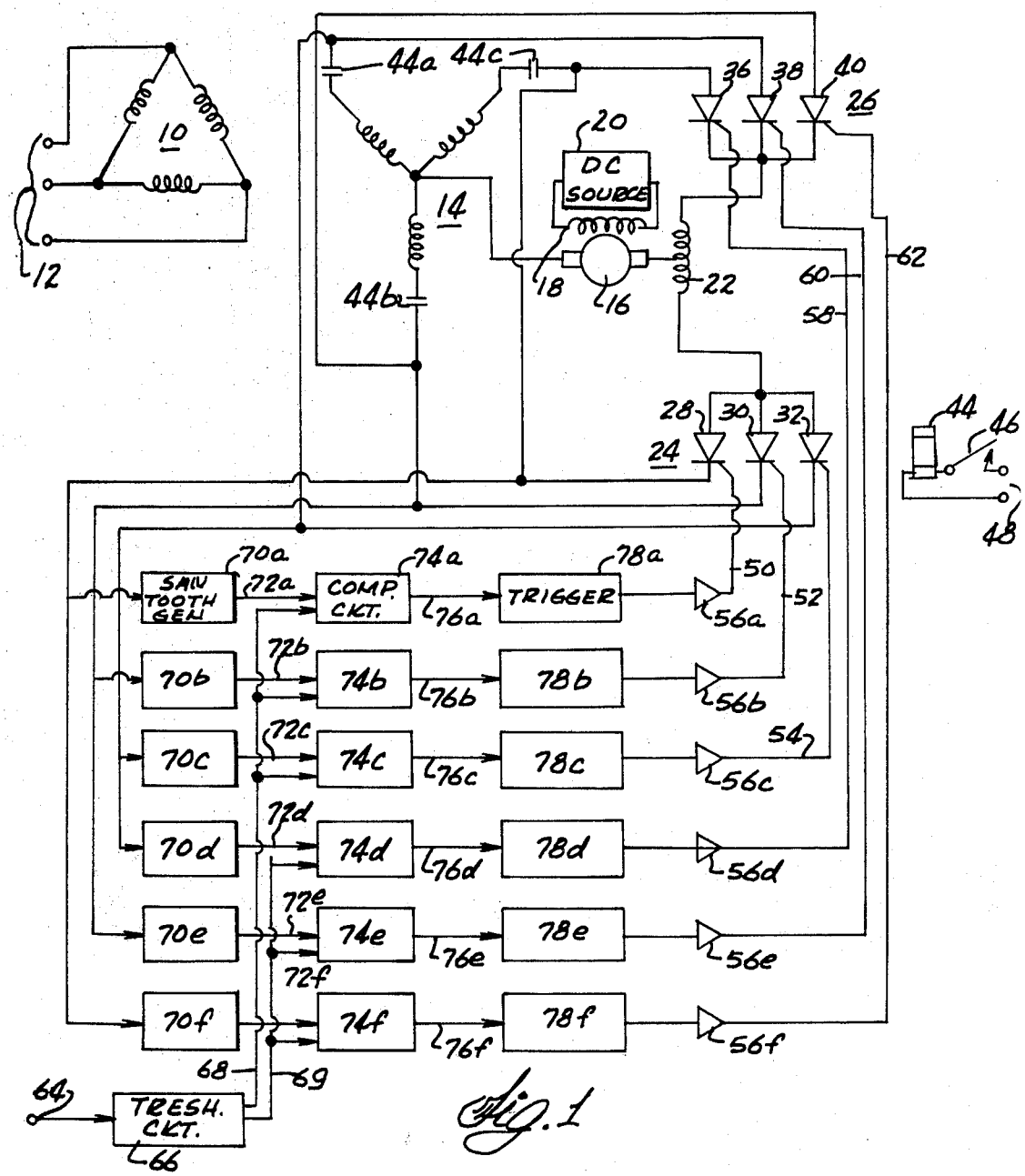
FIG. 1 is a functional block diagram of a servo system incorporating a preferred embodiment of the present invention.

Referring now to FIG. 1, there is shown an illustration, in functional block diagram form, of a servo system which forms a preferred embodiment of the present invention.

A transformer having primary coils 10 is connected to a three-phase source of supply voltage via terminals 12. The primary coils may conveniently be connected in delta form as illustrated. The secondary coils 14 of the transformer are connected in wye form and a motor 16 has one of its terminals connected to the common terminal of the wye. The motor 16 is a DC shunt motor and its field coil 18 is energized by means of an independent DC source 20. The DC source may conveniently be derived by rectifying one of the three phases of input voltage.

The other terminal of the motor 16 is connected to the center tap of an inductor 22.

Six silicon controlled rectifiers, or SCR's are employed in two groups along with the secondary winding 14 of the transformer 24 and 26, which groups are sometimes referred to hereinafter as converters. The converter 24 includes SCR's 28, 30 and 32, each of which has its cathode connected to a different one of the secondary windings 14, and all of their anodes are connected in common to one end of the inductor 22. The converter 26 includes SCR's 36, 38 and 40, each of which has its anode connected to a different one of the secondary windings 14, and their cathodes are connected in common to the opposite end of the inductor 22. A relay, having an actuating coil 44, has contacts 44a, 44b and 44c connected in series with each secondary winding 14. The relay is energized remotely by means of a switch 46 connected in series with the relay coil 44 and a power supply connected to terminals 48, to permit deactivation of the apparatus.

The operation of the two converters 24 and 26 is such as to render one of the converters (including its three SCR's) operable to feed power to the motor and to render the other converter operable to feed power back to the line. Which of the converters executes which function at any given time depends on the times of firing the SCR's as will be more fully described hereinafter.

The three SCR's 28, 30 and 32 of the converter 24 are connected, respectively, by leads 50, 52 and 54 to three amplifiers 56a, 56b, and 56c. The three SCR's 36, 38 and 40 of the converter 26 are connected to three additional amplifiers 56d, 56e and 56f by means of lines 58, 60 and 62, respectively. The outputs from the pulse amplifiers 56 trigger each SCR in timed sequence, depending upon the command to be performed by the system at any given time.

The system command is presented in the form of a signal at a control terminal 64, which is connected as an input to a threshold circuit 66. The threshold circuit 66 establishes steady DC potentials on both of two output lines 68 and 69. The line 68 is connected as an input to three comparator circuits 74a, 74b and 74c, and the line 69 is connected as an input to three other comparator circuits 74d, 74e and 74f. A second input to each of the comparator circuits 74 is derived from an associated sawtooth generator 70. The sawtooth generators 70a–70f produce sawtooth waveforms, synchronized with one of the three AC phases. The sawtooth generators 70a and 70f are synchronized with one phase, and are connected via lines 72a and 72f, respectively, to a second input of the comparator circuits 74a and 74f. Similarly, the sawtooth generators 70b and 70e are synchronized with another phase and are coupled with comparator circuits 74b and 74e via lines 72b and 72e and the sawtooth generators 70c and 70d are synchronized with a third phase and are coupled with the comparator circuits 74c and 74d via lines 72c and 72d.

The comparator circuits 74 produce output pulses on their respective lines 76 when a coincidence is sensed between a combined voltage, resulting from the combining of the two inputs of each comparator circuit, and a fixed voltage level. It is apparent that varying the potential on the lines 68 and 69, by means of changing the input signal applied to the control terminal 64, modifies the time of production of the pulse output produced by the comparator circuits 74. These outputs are connected, individually, as inputs to a plurality of triggers 78a–78f, which shape the output pulses from the comparator networks and apply them to the amplifiers 56. There they are amplified sufficiently to cause triggering of the SCR's in the converters 24 and 26 at the proper time in each cycle.

Figure 6:
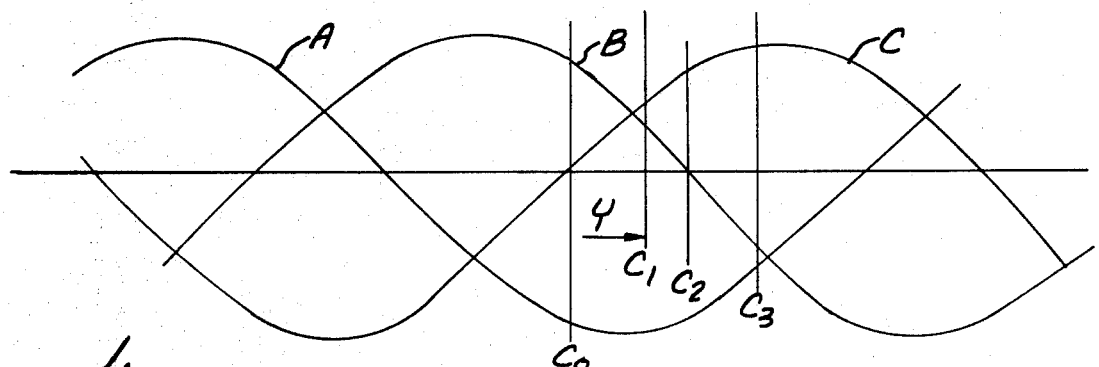
FIG. 6 is an illustration of waveforms of a three-phase voltage source which is employed as a source of power for the preferred embodiment of the present invention.

Referring now to FIG. 6, waveforms of the three phases of a three-phase voltage are illustrated. A time $C_0$ has been designated in FIG. 6 to indicate the firing point for one phase, under a zero power condition, in previously known servo apparatus. The zero power condition may be achieved both when the motor is at standstill and when the motor is decelerating while the motor load demands no power from the motor. In the present invention, the firing point for the zero power condition is displaced by a time interval Y to the time $C_1$. This firing point is for one of the SCR's in one converter, the one having its anode connected to receive phase B of the three-phase voltage. For the zero power condition, all of the energy passed by the SCR between time $C_1$ and time $C_2$ must be stored in the inductance 22. In the period from time $C_2$ to time $C_3$, the energy is returned to the line from the inductor by the continued conduction of the SCR. This returned energy will be the same, for the zero power condition, as the energy between $C_1$ and $C_2$, except for the inherent losses in the system. It will be noted that the voltage waveforms of FIG. 6 (and also of FIGS. 7–9) are with reference to ground, or the central connection of the secondary windings 14. Thus, the voltage of phase B can drop below ground potential while the voltage across the SCR continues positive until the time $C_3$. It is apparent from FIG. 6 that less energy must be stored in the inductance, because of the displacement Y between the prior art zero power firing point $C_0$ and the no-load firing point of the present invention at $C_1$.

Figure 7:
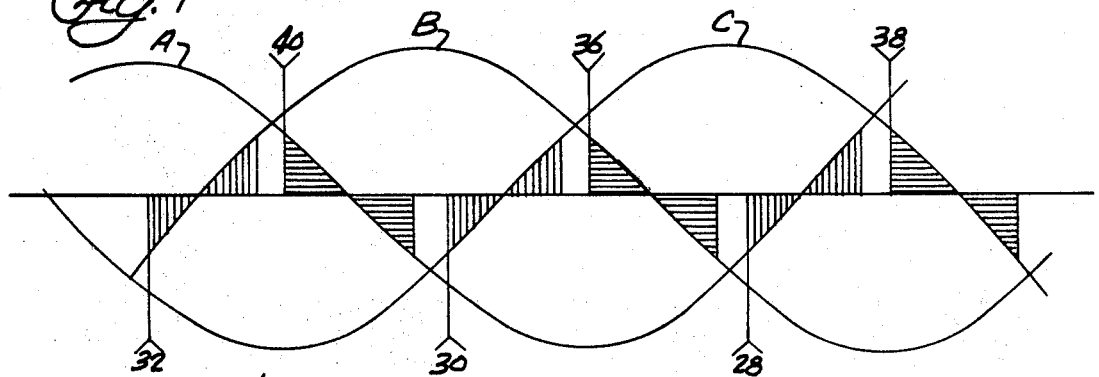
FIGS. 7, 8 and 9 are illustrations of waveforms of a three-phase source of power and indicate, respectively, the range of conduction of the various SCR's and the power section for zero power input to the motor, forward drive to the motor and reverse drive to the motor.
Figure 8:
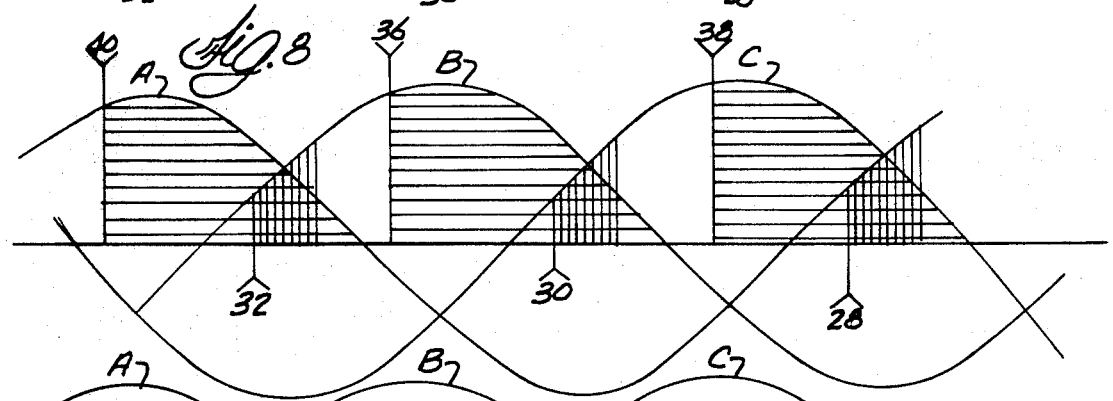
Figure 9:
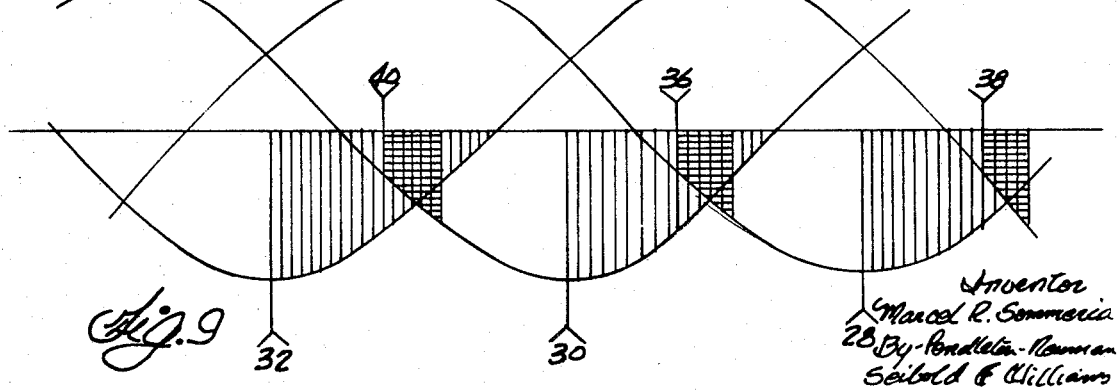

Referring now to FIGS. 7 to 9, the functional operation of the converters 24 and 26 can be understood. In each figure, three sine waves A, B and C are illustrated, each one representing a phase of the three-phase voltage.

In FIG. 7, the firing point for each of the six SCR's in the converters 24 and 26 is shown. SCR's 28, 30 and 32, forming the 24, are triggered during the last portion of the negative-going half-cycles of the three sine waves A, B and C, and the conduction angle of these SCR's is illustrated by vertical shading in FIG. 7. SCR's 36, 38 and 40 are triggered during the last portion of the positive-going half-cycle of the sine waves A, B and C, and the conduction angle of each is illustrated by horizontal shading in FIG. 7. It is apparent that the polarity across all of the SCR's is correct for conduction. The SCR's in the converter 24, which have their cathodes connected to the three-phase voltage source, require that the cathode voltage be negative, relative to the anode, for conduction.

When any of the SCR's is fired, it continues to conduct for the remainder of the half-cycle in which it was fired, and continues to conduct for the first portion of the following half-cycle as illustrated. For the zero power condition, illustrated in FIG. 7, each of the SCR's is conductive for an equal period during each cycle, but there are spaces in which no SCR is rendered conductive each of the conducting periods. Because the SCR's in both converters 24 and 26 are rendered conductive for an equal period during each cycle, there is not net current through the armature 16 in either direction. That is, the average current passing rightwardly through the armature, as viewed in FIG. 1, by virtue of the conduction of the converter 26, is exactly equal to the average current flowing through the armature 16 in the opposite direction, as a result of the converter 26. Therefore, the motor has no torque, and the motor, if it is rotating, is allowed to slow down as the motor load uses up the stored energy of rotation.

To accelerate the motor in one direction, the firing points for the SCR's 28, 30 and 32 are moved in one direction (either advanced or retarded) and the firing points for the SCR's 36, 38 and 40 are moved in the opposite direction. In the condition illustrated in FIG. 8, the SCR's 28, 30 and 32 are fired later during each cycle (i.e., the firing points have been retarded), whereas the firing points of the SCR's 36, 38 and 40 have been advanced. There is, therefore, a net flow of current leftwardly through the armature 16, as viewed in FIG. 1, because of the heavier currents flowing through the converter 26. As illustrated in FIG. 8, the SCR's of the converter 24 have a very small conduction angle. This is because these SCR's are fired very shortly before the voltage across their anode-cathode terminals reverses. As the voltage across the anode-cathode terminals of each SCR depends not only upon the magnitude of the transformer voltage of the phase to which it is directly connected, but also on the voltage level at the armature, this voltage can reverse long after the transformer voltage changes sign, as indicated by the firing points of the SCR's 28, 30 and 32 in FIG. 8.

The motor may be accelerated in the opposite direction by interchanging the direction of shift of the firing points for the SCR's in the converters 24 and 26. This is illustrated in FIG. 9, in which the SCR's 36, 38 and 40 are fired later during each cycle, and the SCR's 28, 30 and 32 are fired earlier.

When the firing points are shifted in either direction from the positions illustrated in FIG. 7, the conduction angle for one converter (for a constant load) is increased more than the conduction angle for the other converter is decreased. This is illustrated for both of the opposite conditions in FIGS. 8 and 9 which represent feeding power to the motor (motoring) in opposite directions. In FIG. 8, the SCR's of the converter 26 (horizontal shading) can be seen to have conduction angles of 120 degrees, while the SCR's of the converter 24 (vertical shading) fire very briefly. In FIG. 9, the opposite is true. By arranging the conduction angles in this manner, the idling current through the inductor 22, during its zero power condition, as illustrated in FIG. 7, may be kept to a minimum while maintaining control of the motor over its full power range. The required size of the inductor 22 is also reduced, for less energy storage is required.

Although the conduction angles of the three SCR's feeding power to the motor (SCR's 36, 38 and 40 in the example of FIG. 8), may each fire for less than 120° at light loads, when the torque is high, the SCR's continue to conduct for 120 degrees until commutated off by the firing of the next SCR of the same polarity.

Referring now to FIG. 5, there is illustrated a graph of the relationship between the average values of the EMF and the counter EMF associated with the converters 24 and 26, and appearing across the motor armature, for a range of firing angles of the SCR's. As the firing angle of one of the converters increases, the counter EMF of the converter having the decreased firing angle increases markedly and approaches a terminating value asymptotically, whereas the EMF of the other converter increases at a constant rate. FIG. 5 illustrates that this condition is fulfilled regardless of which converter has the increased firing angle. The essential condition for operation is that the counter EMF always equal or exceed the EMF, and this condition is satisfied in the present invention. The present invention is not limited by the condition previously believed to be necessary for operativeness, that the counter EMF must always equal the EMF. This equality, which is at all times satisfied in prior art apparatus, is not ordinarily satisfied in operation of the present invention.

The difference between the values of the EMF and the counter EMF, as illustrated in FIG. 5, is the result of the asymmetrical triggering of the SCR's in the converters 24 and 26, which has been described with reference to FIGS. 7, 8 and 9.

Referring now to FIG. 2, a schematic diagram of the SCR firing circuits associated with the SCR 28 is illustrated. Each of the SCR's of the converters 24 and 26 has an identical firing circuit, and so a description of one will suffice for all. A diode 86 is connected in series with a coil 90. The coil 90 is the secondary of a pulse transformer 91, which is adapted to produce a pulse to fire the SCR 28 at the appropriate time. Turn off of the SCR 28 is accomplished by the reversal of the polarity of the supply voltage which is connected in series with the SCR 28. A capacitor 88, connected between the gate and cathode of the SCR 28, insures that the pulse from the coil 90 lasts long enough to turn on the SCR 28.

The primary coil 92 of the pulse transformer 91 is illustrated in FIG. 4 connected in series with a SCR 94. The primary 92 is energized by means of the SCR 94 discharging a capacitor 96 through the primary 92 when the gate signal is applied to the SCR 94. The capacitor 96 is charged through a resistor 98, connected between the capacitor 96 and a source of positive potential connected to a terminal 99.

The SCR 94 and its associated circuitry comprises one of the amplifiers 56 illustrated in FIG. 1. One such pulse amplifier is provided for each SCR of both the converters 24 and 26. The manner in which the gate pulse for the SCR 94 is generated will now be described, with reference to FIGS. 3 and 4.

The input control of the threshold circuit illustrated in FIG. 3 comprises a potentiometer 100. A regulated voltage is applied across the potentiometer 100 so that the position of its tap establishes a definite voltage on a line 102 connected to the tap. The line 102, in one application of the present invention, is connected to the control terminal 64 through a tachometer 104, which senses the velocity of a moving part of the machine powered by the servo unit.

The regulated voltage applied across the potentiometer 100 is derived from a transformer, having a center tapped secondary with two coils 106, connected to a bridge rectifier including diodes 108. The output of the bridge rectifier appears between lines 110 and 112 which are, respectively, positive and negative in polarity. The center tap of the transformer secondary 106 is connected to a line 114 and establishes the reference potential. The voltage on line 110 is filtered by means of a pi network including resistor 116 and capacitors 118, and is regulated by means of a Zener diode 120. The voltage on the line 112 is filtered and regulated by means of a similar pi network 122 and Zener diode 124. The anode of the Zener diode 120 is connected to one side of the potentiometer 100, and the cathode of the Zener diode 124 is connected to the opposite side of the potentiometer 100.

The input terminal 64, at which is provided the DC level established by position of the tap of the potentiometer 100 and the DC voltage generated by the tachometer 104, is connected by means of a resistor 128 to an input 130 of an operational amplifier 132. The other input 134 of the operational amplifier is connected to a reference potential via line 136. The minus sign associated with the input 130 indicates that the output of the amplifier is out of phase with this input.

The line 136 is connected to the junction of two Zener diodes 135 and 137 connected in series with a resistor 139 between the lines 114 and 112. The potential on the line 136 is therefore fixed at some level below that of the line 114.

The operational amplifier 132 is powered by means of terminals 138 and 140, which are connected to the anode and cathode of the Zener diodes 135 and 137, respectively. The output of the amplifier 132, which is produced at terminal 141, is connected through a resistor 142 to the base of a transistor 146, connected in emitter follower configuration. A resistor 148 is connected between the emitter and a line 151, leading to the cathode of the Zener diode 124. The collector of the transistor 146 is connected to the anode of the Zener diode 120 through a resistor 150. The output of the transistor 146 is taken from its emitter and is supplied via the line 68 to the three comparator circuits 74a, 74b and 74c in FIG. 1. The output terminal 141 of the operational amplifier 132 is also connected via a line 160 to an input 162 of an operational amplifier 164, through a resistor 163. The amplifier 164 has its other input 166 connected to the line 136. The amplifier 164 is powered by means of connections to the Zener diodes 135 and 137.

The output of the amplifier 164 is connected by means of a resistor 174 to the base of a transistor 178. The transistor 178 is connected in emitter follower configuration, with an emitter resistor 180 connected to the line 151, and a resistor 182 connected from its collector to the anode of the Zener diode 120. An output is taken from the transistor 178 at its emitter, and is supplied to comparator networks circuits 74d, 74e and 74f via line 69.

The operational amplifier 132 is provided with a feedback network 191, interconnected between its output 141 and its input 130, and consisting of a resistor 192 connected in series with a parallelly connected resistor 194 and a capacitor 196, and a resistor 198 and a capacitor 199 connected in parallel with the aforementioned components. Bias is applied to the input 130 of the amplifier 132 by means of a potentiometer 204 and a fixed resistor 206.

The operational amplifier 164 is provided with a feedback network between its output and its input comprising a series connected resistor 201 and capacitor 203, and a resistor 205 connected in parallel with the resistor 201 and the capacitor 203. The feedback network is chosen so that the amplifier 164 has unity gain. Therefore, the outputs of the two operational amplifiers 132 and 164 will at all times be equidistant from the no-load value. These voltages, after being amplified by the common emitter circuits employing transistors 146 and 178 retain the same relationship, and are employed by the comparator circuits 74 to derive the firing times of the SCR's of the converters 24 and 26.

Inasmuch as the sawtooth generator 70, the comparator circuits 74 and the triggers 78 are all identical for each of the 6 SCR's employed in the two converters, only one combination of these elements will be described in detail. A schematic diagram of these circuits are illustrated in FIG. 4, which will now be described. A peaking transformer 214 is provided, and its primary terminals 215 are connected to one of the phases of the three phase voltage. The secondary of the transformer 214 is connected in series with a diode circuit 216, a rheostat 218, and the input of a Darlington amplifier circuit 220. The Darlington circuit consists of a pair of NPN transistors 222 and 224, and the input of the circuit is applied between the base of transistor 222 and the emitter of transistor 224, the latter being also connected to ground.

The base of the transistor 222 is also connected by way of a fixed resistor 226 and a rheostat 228 to terminal 230 which is connected to a negative source of voltage. The collectors of both transistors of the Darlington circuit are connected together, and are connected through a resistor 232 to a terminal 231, connected to a source of positive voltage. A capacitor 234 connects the common collectors to the base of the transistor 222.

The output of the circuit is connected through a resistor 236, connected from the collectors to a junction point 237, to which is also connected a resistor 240 which leads to the line 68 connected from the threshold circuit of FIG. 3.

The junction of the resistors 236 and 240 is connected to the input of a Schmitt trigger circuit 242 including transistors 244 and 246. The emitters of the transistors 244 and 246 are connected in common and through a resistor 248 to ground. The collectors of the transistors 244 and 246 are connected to a source of positive potential, respectively, through resistors 249 and 251. The base of the transistor 244 is biased by a resistor 253 connected from its base to a voltage divider including resistors 259 and 267 connected between the terminal 231 and ground. The circuit 242 has essentially a bistable output, and constitutes the trigger 78. The state of the output depends upon the value of the input voltage, in relation to the cut-off potential. In its normal condition, the collector of the transistor 246 is at a relatively negative potential.

When the input voltage rises above the threshold value, the transistor 244 conducts, and cuts off the transistor 246 to give a positive pulse, which pulse is delivered through a capacitor 250, connected between the collector of the transistor 246 and the gate of the SCR 94. A resistor 252 is connected between the gate and cathode of the SCR. The cathode is also connected to a source of negative potential via terminal 254. A positive pulse, generated by the circuit 242, fires the SCR 94, discharging the capacitor 96 through the transformer 91 to fire the SCR 28 (FIG. 2). The inductance of the transformer 91, in cooperation with the capacitor 96, cuts off the SCR 94 after it has conducted for a short time. Also, a resistor 255 and a capacitor 257, connected in series between the output of the circuit 242 and the anode of the SCR 94 also helps to cut off the SCR 94 on the trailing edge of the pulse from the Schmitt trigger.

In operation, the peaking transformer 214 derives a pulse once during each cycle of the phase of the three-phase voltage to which it is connected, and very rapidly discharges the capacitor 234 through the diode circuit 216 and the resistor 232. A variable resistor 218 is also included in this circuit so that the time constant of the circuit can be adjusted.

After discharging, the capacitor 234 is charged at a constant current rate by the Darlington circuit 220, which forms a Miller integrator with the capacitor 234 employed as a feed-back element. The voltage at the output of the circuit, connected to the resistor 236, increases at a constant rate after the pulse from the transformer 214. The time constant of the charging circuit may be controlled by means of the variable resistor 228. The voltage present at the base of the transistor 244 is a function of the sum of (1) the voltage on line 68 and (2) the voltage at the collector of the transistor 224. Since the voltage on the line 68 is constant, the voltage at the base of he transistor 244 increases until the threshold voltage of the trigger circuit 242 is reached, at which point the circuit produces a positive pulse to fire the SCR 94 and the SCR 28, as explained above. The instant during each cycle when the threshold potential is reached depends upon the level of voltage on the line 68, so that a change in the value of this voltage directly affects the angle of conduction of the SCR 28 (FIG. 2). If the level on the line 68 is high, the cut-off value is reached sooner during each cycle. If the level is low, the cut-off value is reached later, and the firing point of the SCR 28 is retarded.

The other five groups of circuits shown in block diagram form in FIG. 1 are identical to that illustrated in FIG. 4, except that the three comparator circuits 74d, 74e and 74f are connected to the line 69, which has a voltage level inverse to that present on the line 68, as explained above. Accordingly, when the firing angles of the three circuits connected to the line 68 is increased, by reducing the voltage level on the line 68, the firing angle of the other three circuits is decreased by a corresponding increase in the voltage level on the line 69.

As has been described above, it is important in the present invention that the time of firing the SCR's which are connected in the power circuit must be advanced more than it is retarded. This is accomplished by additional circuitry illustrated in FIG. 3 and which will now be described.

The output of the operational amplifier 132 is connected by way of the resistor 142 to the input of the emitter follower circuit incorporating the transistor 146. It is also applied, through the same resistor and via a line 256 to the junction of a pair of series connected diodes 258 and 260. The diode 258 has its cathode connected to the tap of a potentiometer 262 which is connected in parallel with the Zener diode 135. Similarly, the anode of the diode 260 is connected to the tap of a potentiometer 264 which is connected in parallel with the Zener diode 137. The position of the tap of the potentiometer 262 limits the most positive voltage which can occur on the line 256 (and also thereby limits the maximum voltage level which can occur on the line 68) to the value selected by the position of the tap of the potentiometer 262. In a similar way, the position of the tap of the potentiometer 264 limits the most negative voltage which can occur on the line 68.

The output of the operational amplifier 164 is connected through the resistor 174 to the junction of a pair of series connected diodes 266 and 268, connected in similar fashion to the diodes 258 and 260. Two potentiometers 270 and 272 are provided in association with the diodes 266 and 268, and the settings of these potentiometers establish the maximum and minimum voltage levels on the line 69.

It has been pointed out that the voltage level on the line 68 affects the conduction angle of the SCR 28 (FIG. 2). Therefore, the maximum and minimum voltage levels correspond, respectively, to the earliest and the latest times that the SCR 28 can be fired. The potentiometers 262, 264, 270 and 272 are adjusted so that the voltage on the lines 68 and 69 can swing above the level corresponding to the no-load voltage level by a greater magnitude than it can swing below it. The no-load voltage level is the only one which the operational amplifiers 132 and 164 can produce simultaneously, and also corresponds to that produced when the tap of the potentiometer 100 is in approximately midrange and the tachometer 104 is not producing an output. The firing points of the six SCR's 28, 30, 32, 36, 38 and 40 are adjusted for the no-load condition by means of the variable resistors 218 and 228 (FIG. 4). By suitably adjusting these variable resistors for each of the six sawtooth generators, the six SCR's 28, 30, 32, 36, 38 and 40 all fire equally, for a short period near the end of each half-cycle of each phase, as illustrated in FIG. 7.

Six sawtooth generators, and associated circuitry, are required in the apparatus of the present invention, because the six SCR's must be fired at six different times during a single cycle. These times are synchronized by means of the peaking transformer 214, each of which is connected to a phase of the three-phase power supply. It is apparent, therefore, that the three SCR's 28, 30 and 32, forming the converter 24, are always fired 120 degrees apart, and the SCR's 36, 38 and 40, forming the converter 26, are also fired 120 degrees apart. When one converter is advanced and the other retarded, therefore, the three SCR's of one converter are advanced together, maintaining a separation of 120 degrees, and the three SCR's of the other converter are retarded together, also maintaining the 120 degree separation.

Figure 10:
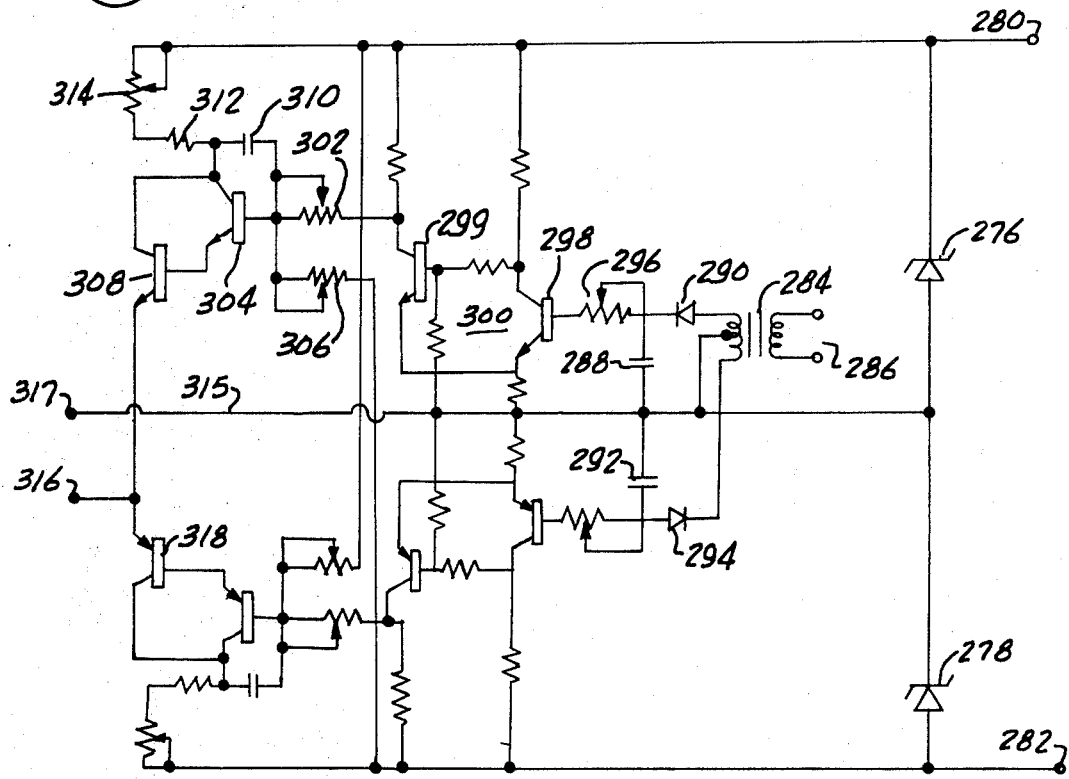
FIG. 10 is a schematic circuit diagram of an alternative waveform generator.
Figure 11:
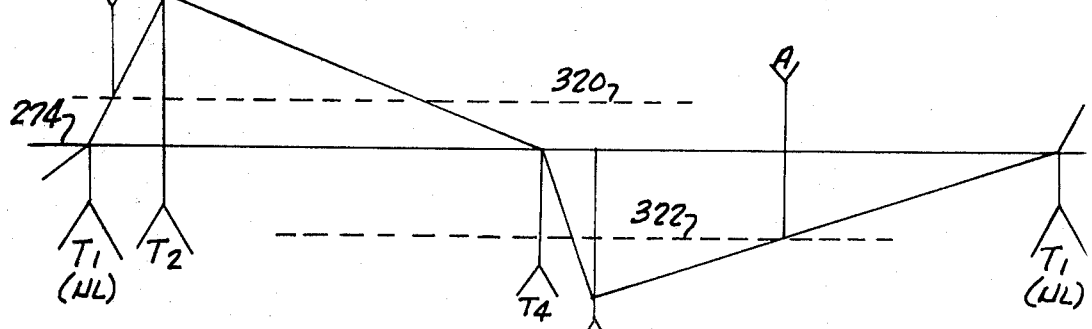
FIG. 11 is an illustration of the waveform generated by the circuit of FIG. 10.

Referring now to FIG. 10, there is shown a waveform generator which may be employed as an alternative to the sawtooth generator illustrated in schematic form in FIG. 4. This generator produces the waveform shown in FIG. 11, seen to be a complex sawtooth-type waveform made up of alternating half-cycles, each half-cycle having a steep leading edge and a shallow trailing edge. The no-load condition is represented by a line 274 at the average value of the waveform. The line 274 crosses the curve at the beginning of each half-cycle, at the junction of the steep and shallow portions of the waveform. When the waveform generator of FIG. 10 is substituted for each of the sawtooth generators 70, the output of each is connected to the circuit 242 via the resistor 236 (FIG. 4) so that the circuit 242 is actuated only by the ascending part of the waveform, and the power SCR connected to the circuit is fired each cycle at the time indicated in FIG. 11 as NL. When the firing angle of the SCR is to be increased, the SCR is fired lower on the shallow part of the waveform at time A as indicated in FIG. 11, and when the firing angle is to be decreased, the SCR is fired higher up on the steep part of the waveform (time B). It is therefore apparent that the rate of increase in the firing angle is much greater than the rate of its decrease, for changes in the control voltage level produced by the threshold circuit 66 (FIG. 1).

The waveform generator of FIG. 10 employs a pair of Zener diodes 276 and 278 connected in series between a source of positive potential connected to a terminal 280 and a source of negative potential connected to a terminal 282. The two Zener diodes 276 and 278 form a regulated power supply for the circuit.

A peaking transformer 284 has its primary terminals 286 connected to one phase of the input voltage, to synchronize the operation of the circuit. Once each cycle the transformer 284 produces a pulse which charges a capacitor 288 through a diode 290, and 180 degrees later the transformer produces a pulse which charges a second capacitor 292 through a second diode 294. The charges on the two capacitors 288 and 292 have opposite signs relative to a reference voltage on line 315, connected to terminal 317. The reference terminal of each capacitor is connected to the junction of the diodes 276 and 278, to the center tap of the secondary of the transformer 284, and to the line 315.

The upper end of the capacitor 288 is connected via a variable resistor 296 to the base of a transistor 298. The transistor 298, together with another transistor 299, forms a Schmitt trigger circuit 300. The operation of the Schmitt trigger 300 is to produce a relatively high voltage at the collector of the transistor 299, whenever the input voltage at the base of the transistor 298 exceeds a certain threshold value. When the voltage present at the base of the transistor falls below the threshold voltage, the transistor 299 abruptly conducts, lowering the voltage present at its collector.

In operation, the Schmitt trigger 300 functions to raise the voltage at the collector of the transistor 299 beginning with the pulse which charges the capacitor 288, and continuing until the capacitor has been discharged to a value below the threshold voltage of the Schmitt trigger 300. This duration is controlled by the variable resistor 296, which is set for the duration between time $T_1$ and $T_2$ as indicated in FIG. 11.

The output from the Schmitt trigger 300 is connected through a variable resistor 302 to the base of a transistor 304. The base of the transistor 304 is also connected, by another variable resistor 306, to the negative potential at terminal 282. The transistor 304 is connected in a Darlington circuit with another transistor 308, and a capacitor 310 is connected between the common collector connection to the base of the transistor 304, to form a Miller integrator. The collectors of the transistors 304 and 308 are connected to the positive terminal 280 via a fixed resistor 312 and a variable resistor 314. An output terminal 316 is connected to the emitter of the transistor 308, and when the circuit is used to replace the sawtooth generator 70 of FIG. 1, the terminal 316 is connected through the resistor 236 to the input of the trigger circuit 242 in FIG. 4.

The Miller integrator circuit including the transistors 304 and 308 produces an output, at the emitter of the transistor 308, which is the time integral of the input applied to it. The input constitutes the signal derived from the collector of the transistor 299, furnished through the variable resistor 302. The input is biased by the variable resistor 306, which connects the base of the transistor 304 to the negative potential at the terminal 282. The output of the Miller integrator comprises a rapidly rising signal during the period when the collector of the transistor 299 is high, and a slowly falling signal after the voltage level at the collector of the transistor 299 drops. As a result, the positive half-cycle of the waveform of FIG. 11 is produced. The level rises rapidly from time $T_1$ to time $T_2$, and falls slowly from time $T_2$ to the time marked $T_4$ in FIG. 11.

The lower half of the circuit of FIG. 10 is identical to what has already been described, but PNP transistors are employed so that the output of the lower half of the circuit produces the lower half-cycle which is the inverse of that produced by the upper half of the circuit, falling steeply from time $T_4$ to time $T_3$, and rising slowly from time $T_3$ to time $T_1$. In addition, the lower half-cycle is displaced from the upper half-cycle by 180 degrees, because the capacitor 292 is charged alternately with the capacitor 288. The output of the lower half of the circuit is available at the emitter of a transistor 318 which is the counterpart of the transistor 308, and is connected to the terminal 316.

The two variable resistors 302 and 306, and their counterparts in the lower half of the circuit, are adjusted to give the waveform shown in FIG. 11. The value of the variable resistor 306 determines the slope of the shallow part of the waveform, and once the resistor 306 is set, the value of the resistor 302 determines the slope of the steep part of the waveform. The two resistors are set so that each half-cycle ends just as the next one begins. The variable resistor 314, and its counterpart in the lower half of the circuit, adjust the amplitude. These resistors are adjusted so that both half-cycles are of equal amplitude and of the proper amplitude to cooperate with the range of the voltage levels on the lines 68 and 69.

Three of the generators 70 can be eliminated from the apparatus in FIG. 1 if the circuit of FIG. 10 is substituted for each of the generators 70a, 70b and 70c, and the inverted waveforms from those generators are applied, respectively, to comparator circuits 74f, 74e and 74d. When the circuit of FIG. 10 is employed, the potentiometers 262, 264, 270 and 272 of the threshold circuit (FIG. 3) are preferably adjusted to permit equal excursions of the voltage on lines 68 and 69, since the desired asymmetrical triggering results from the waveshape generated by the circuit of FIG. 10.

Although the circuit of FIG. 10 controls the relative rates of advancement and retardation of the firing time of one of the SCR's by means of producing a special sawtooth-type waveform, the same result could be achieved by instead employing a function generator, connected in series with the lines 68 and 69, to vary the voltage level in accordance with its magnitude, and especially in accordance with its departure from the voltage level representing the no-load condition. For example, voltage levels above the no-load level, which produce decreased firing angles, could be compressed toward the no-load voltage, while voltage levels below the no-load voltage would be unmodified. In this way, the firing angle of one converter would be increased from the no-load level more rapidly than the firing angle of the other converter would be decreased. Alternatively, the difference between voltage levels below the no-load level could be expanded to produce the same result. In either case, the compression or expansion could be achieved by means of amplifiers having different gains above and below a predetermined level, or by function generators formed of diodes and resistors. Both types of circuits are well known in the art.

The circuit of FIG. 10 may also be employed to adapt prior art servo systems for use with the present invention. The circuit of FIG. 10, together with the threshold circuit of FIG. 3 and the comparator and triggering circuits of FIG. 4, is simply substituted for the firing circuitry of the prior art system. Such a modified system would have a waveform generating circuit like that of FIG. 10 for each phase of the transformer voltage. For a single phase system employing four SCR's in a bridge arrangement, the normal and inverted outputs of the circuit of FIG. 10 are employed to fire two SCR's 180° apart. If the waveform illustrated in FIG. 11 were inverted, the no-load firing point would be at $T_4$, the time B would lie between time $T_4$ and time $T_3$ in the inverted waveform, while the time A would lie between $T_2$ and $T_4$, respectively 180° out of phase with the times A and B as indicated in FIG. 11.

Figure 12A:
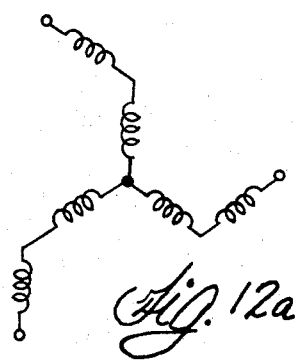
FIGS. 12a and 12b are diagrammatic illustrations of alternative transformer connections.

The illustrative embodiment of the present invention illustrated in the drawings incorporates a three-phase supply voltage with Y-connected secondary windings. It is preferable to employ a three-phase transformer with six secondary windings instead of three, the six windings being Y-connected with each leg of the Y comprising two series-connected windings, as shown in FIG. 12a. The voltage induced in the two windings of each leg are out of phase so that there is less saturation of the transformer during operation.

Figure 12B:
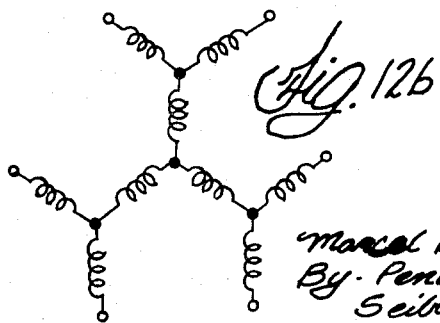
Figure 13:
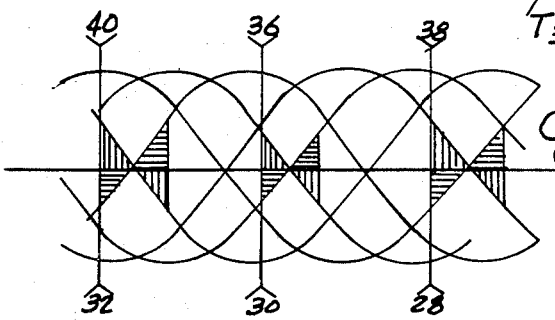
FIG. 13 is an illustration of waveforms associated with the apparatus of FIG. 1 when the transformer connections of FIG. 12b are used.

An alternative transformer arrangement is illustrated in FIG. 12b, where a transformer having nine secondary windings is employed to give a six phase output voltage. When the transformer of FIG. 12b is employed, each of the six SCR's in the converters 24 and 26 (FIG. 1) is connected to an individual secondary terminal of the transformer. The waveform of the idling condition for this connection is shown in FIG. 13. The SCR's are fired in pairs during the idling condition, with the SCR's 32 and 40, 30 and 36, and 28 and 38 being fired together. As a result, there is no current flow through the motor at no load, and motor chatter, vibration and heating are reduced. The sawtooth generators 70 (FIG. 1) are connected to the appropriate terminals of the transformer secondary to produce the firing points indicated in FIG. 13.

Where means is employed to sense passage of the output of the waveform generators downwardly through a predetermined voltage level, as well as upwardly, a single waveform produced by the circuit of FIG. 10 may be employed to fire four separate SCR's. As downward passage is indicated by the trailing edge of the pulse generated by the Schmitt trigger 242 of FIG. 4, the inverted output of the Schmitt trigger may be employed to indicate a downward passage through the predetermined voltage level. A circuit like that including the SCR 94 (FIG. 4) is provided in order to fire the power SCR's. The normal and inverted waveforms of FIG. 11 are connected to separate comparators, and each comparator fires a SCR on the rising portion of one half cycle, and a second SCR on the dropping portion of the half cycle. The four firing points are indicated in FIG. 11 where the waveform crosses the dashed lines 320 and 322. Each dashed line crosses the waveform twice, and each crossing triggers a SCR. The voltage levels represented by the lines 320 and 322 differ from the no-load level 274 by the same amount, so that the two SCR's forming each converter are always fired 180° apart. This is the correct relationship for single-phase operation, when the four SCR's are connected in a full-wave-bridge-type of circuit.

An arrangement similar to the one just described may advantageously be employed to modify the system illustrated in my Pat. No. 3,237,075 to incorporate the present invention. In making such modification, the circuit of FIG. 10 replaces the transformer 81 and the capacitor shown in FIG. 1 of the patent, with the output terminals 316 and 317 of FIG. 10 connected to the resistors 85 and 86 of the patent. As thus connected, the two transistors 82 and 83 of the patent are controlled with the sum and difference of output of the waveform generator and the voltage generated by the transistor 69 of the patent. The waveform generator of FIG. 10 is synchronized with the AC supply so that the waveform crosses a line representing the average value of the supply voltage near the end of each half-cycle, and the peak value of each of the half-cycles of the waveform occurs when the supply voltage is zero. This insures that the idling current, which obtains in the no-load condition when the SCR's are fired at the times when the waveform passes through its average value, is low.

Accordingly, the quantity of the inductance used in the circuit of the patent may be reduced.

In the above description, reference has been made to SCR's as the elments for controlling motor current. It will be understood by those skilled in the art that other forms of thyristors may be substituted for the SCR's. The term thyristor is used in the broad sense, that thyratrons and other equivalent switches are implied, as well as solid state devices.

In the embodiments illustrated in the drawings, values of some of the components which have been found to be satisfactory are as follows:

| | |
|---|---|
| 96 | 6 mfd. |
| 98 | 4.7K. |
| 100 | 100. |
| 128 | 47K. |
| 142 | 10K. |
| 163 | 100K. |
| 174 | 10K. |
| 192 | 30K. |
| 194 | 2M. |
| 196 | 1.0 mfd. |
| 198 | 47K. |
| 201 | 10K. |
| 203 | .001 mfd. |
| 204 | 500K. |
| 205 | 100K. |
| 206 | 470K. |
| 218 | 1K. |
| 226 | 33K. |
| 228 | 200K. |
| 232 | 1.5K. |
| 234 | 0.2 mfd. |
| 236 | 15K. |
| 240 | 15K. |
| 248 | 27. |
| 249 | 4.7K. |
| 250 | .047 mfd. |
| 251 | 2.7K. |
| 252 | 1K. |
| 253 | 2.2K. |
| 255 | 470. |
| 257 | .01 mfd. |
| 259 | 39K. |
| 262 | 1K. |
| 264 | 1K. |
| 267 | 1.5K. |
| 270 | 1K. |
| 272 | 1K. |
| 288 | .057 mfd. |
| 296 | 20K. |
| 302 | 20K. |
| 306 | 25CK. |
| 310 | 0.1 mfd. |
| 312 | 1K. |
| 314 | 2K. |
| 132 and 164 | Philbrick No. PP55AU. 2K. |

By the foregoing description, the present invention has been described with sufficient particularity as to enable others skilled in the art to make and use the same, to adapt the same in a variety of ways for use under varying conditions of service, without departing from the essential features of novelty thereof, which are intended to be defined and secured by the appended claims.

What is claimed is:

1. In a servo system for controlling a DC motor energized by a source of AC voltage including inductance means connected with said motor, the combination comprising first and second converters, said converters each having a plurality of thyristors, one for each phase of said AC voltage, means for connecting one terminal of each of said thryistors in said first converter to a first terminal of said inductance means, means for connecting another terminal of each of said thyristors in said one converter to an individual phase of said AC voltage, means for connecting one terminal of each of said thryistors in said second converter to a second terminal of said inductance means, means for connecting another terminal of each of said thyristors in said second converter to an individual phase of said AC voltage, triggering means for firing said thyristors, and means for providing a control voltage, said triggering means being responsive to said control voltage for changing the firing angle of said thyristors in response to a change in the level of said control voltage by increasing the firing angle of the thyristors of one converter by a first amount which is a function of said control voltage, decreasing the firing angle of the thyristors in said second converter by a second amount less than said first amount.

2. Apparatus according to claim 1, wherein said triggering means includes a waveform generator, means for synchronizing said waveform generator with a phase of said AC voltage, and comparator means responsive to said waveform generator and to said control voltage for firing one of said thyristors.

3. Apparatus according to claim 2, including first means for limiting the maximum level of said control voltage above a predetermined level and second means for limiting the minimum level of said control voltage below said predetermined level, said predetermined level being that which effects equal firing angles of all of said thyristors, said maximum and minimum levels differing in the amount of their separation from said predetermined level.

4. Apparatus according to claim 2, wherein said waveform generator comprises means for generating a voltage waveform during each cycle of said AC voltage, said waveform increasing at a steep, relatively constant slope from a reference voltage level and then decreasing at a shallow, relatively constant slope to said reference voltage level; and said comparator means comprises means for combining said waveform and said control voltage to produce a combined voltage, means for sensing when said combined voltage crosses a fixed voltage level, and means responsive to said sensing means for firing said thyristor.

5. Apparatus according to claim 4, wherein said waveform generator comprises means responsive to one phase of said AC voltage for producing a relatively constant signal for less than a quarter of a cycle of said AC voltage, and integrator means responsive to said relatively constant signal for generating a steeply increasing voltage during the period of said relatively constant signal and a shallowly decreasing voltage during the remainder of one half-cyle of said AC voltage.

6. Apparatus according to claim 1, wherein said triggering means comprises means for providing an input signal corresponding to a predetermined condition for said motor, a tachometer connected to said motor for generating a voltage proportional to motor speed, means responsive to said input signal and to said tachometer voltage for generating said control voltage, means responsive to said control voltage for providing an inverted control voltage, said triggering means including a separate comparator circuit for each thyristor, means for connecting said control voltage to half of said comparator circuits, means for connecting said inverted control voltage to the other half of said comparator circuits, and means synchronizing each of said comparator circuits with said AC voltage, said comparator circuit being responsive to said control voltage or to said inverted control voltage and to said synchronizing means for firing said thyristors in timed relation.

7. Apparatus according to claim 1, wherein said triggering means includes means to fire said thyristor for equal conduction angles of less than 60 degrees, in response to a predetermined level of said control voltage.

8. A method for controlling a DC motor energized with an AC voltage source, said motor being connected with an inductor, and a first set of switches including a separate switch connected between a terminal of said inductor and each phase of said AC voltage and a second set of switches including a separate switch connected between another terminal of said inductor and each phase of said AC voltage; the method comprising the steps of closing each of said switches once during each cycle of said AC voltage and opening each of said switches when the current through said switches reaches zero, said closing of each of the switches of said first set being at equally spaced times during each cycle and said closing of each of the switches of said second set also being at equally spaced times during each cycle, and advancing the times of closing the switches of said first set and retarding the times of closing the switches of said second set, said advancement being greater than said retardation.

9. A method according to claim 8, including the step of advancing the times of closing the switches of said first set more rapidly than the times of closing the switches of said second set are retarded.

10. A method according to claim 8, including the step of closing each of said switches at equally spaced times and opening each of said switches at equally spaced times before another switch is closed.

References Cited

UNITED STATES PATENTS

| | | | |
|---|---|---|---|
| 3,406,325 | 10/1968 | Rosa | 318—227 |
| 3,414,800 | 12/1968 | Sheldrake | 318—227 |
| 3,430,123 | 2/1969 | Corry et al. | 318—227 |

ORIS L. RADER, Primary Examiner

K. L. CROSSON, Assistant Examiner

U.S. Cl. X.R.

318—326, 345

UNITED STATES PATENT OFFICE
CERTIFICATE OF CORRECTION

Patent No. 3,548,278　　　　　　　Dated December 15, 1970

Inventor(s) Marcel R. Sommeria

It is certified that error appears in the above-identified patent and that said Letters Patent are hereby corrected as shown below:

Column 2, line 5, "accident" should read -- accidental --; line 31, "rectifiers" should read -- rectifier --. Column 4, line 43, after "the" and before "24" insert -- converter --; line 62, after "conductive" insert -- between --; line 65, "no should read -- no --; line 69, "26" should read -- 24 --. Column 6, line 15, "a" should read -- an --; line 22, "comprises" should read -- comprise --; line 53, "inpjut" should read -- input --. Column 8, line 46, "he" should read -- the --. Column 12, line 45, "a" should read -- an --; line 50, "a" should read -- an --. Column 13, line 53, "25CK" should read -- 250K --; line 57, after "PP55AU" cancel "2K". Column 14, claim 6, line 64, "circuit" should read -- circuits --; claim 7, line 69, "thyristor" should read -- thyristors --.

Signed and sealed this 23rd day of March 1971.

(SEAL)
Attest:

EDWARD M.FLETCHER,JR.　　　　　　　WILLIAM E. SCHUYLER,
Attesting Officer　　　　　　　　　Commissioner of Patent